United States Patent
Bae et al.

(10) Patent No.: US 12,531,264 B2
(45) Date of Patent: Jan. 20, 2026

(54) SEQUENTIAL PRESSURE FORMATION JIG AND FORMATION METHOD USING SAME

(71) Applicant: LG ENERGY SOLUTION, LTD., Seoul (KR)

(72) Inventors: Dong Hun Bae, Daejeon (KR); Joon Sung Bae, Daejeon (KR); Eui Kyung Lee, Daejeon (KR); Sang Jih Kim, Daejeon (KR); Suk Hyun Hong, Daejeon (KR); Beom Koon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 980 days.

(21) Appl. No.: 17/417,524

(22) PCT Filed: Oct. 22, 2020

(86) PCT No.: PCT/KR2020/014463
§ 371 (c)(1),
(2) Date: Jun. 23, 2021

(87) PCT Pub. No.: WO2021/085931
PCT Pub. Date: May 6, 2021

(65) Prior Publication Data
US 2022/0115688 A1    Apr. 14, 2022

(30) Foreign Application Priority Data
Oct. 30, 2019    (KR) .................. 10-2019-0136343

(51) Int. Cl.
*H01M 10/04* (2006.01)
*H01M 10/058* (2010.01)

(52) U.S. Cl.
CPC ..... *H01M 10/0468* (2013.01); *H01M 10/058* (2013.01)

(58) Field of Classification Search
CPC .......................... H01M 10/0468; H01M 10/058
See application file for complete search history.

(56) References Cited

U.S. PATENT DOCUMENTS

| | | | |
|---|---|---|---|
| 2015/0170712 A1 | 6/2015 | Redmann | |
| 2018/0191023 A1 | 7/2018 | Cao et al. | |
| 2019/0157708 A1* | 5/2019 | Mao | H01M 10/0585 |

FOREIGN PATENT DOCUMENTS

| | | | |
|---|---|---|---|
| CN | 101341611 A | | 1/2009 |
| CN | 103094620 A | * | 5/2013 |

(Continued)

OTHER PUBLICATIONS

Machine English Translation of CN 208256831 U (Year: 2018).*

(Continued)

*Primary Examiner* — Matthew T Martin
*Assistant Examiner* — Katherine N Higgins
(74) *Attorney, Agent, or Firm* — Birch, Stewart, Kolasch & Birch, LLP (57) ABSTRACT

A formation jig includes a pressing plate configured to press a battery cell, the pressing plate having a first through hole; a pressing support plate configured to support the battery cell when the pressing plate presses an upper or lower portion of the battery cell, the pressing support plate having a second through hole and a third through hole; a first screw configured to pass through first through hole of the pressing plate and the second through hole of the pressing support plate and to move the pressing plate in a gap-adjusting direction by rotation thereof; and a second screw configured to pass through the third through hole of the pressing support plate and to move the pressing support plate in the gap-adjusting direction by rotation thereof. A diameter of the second through hole is larger than a diameter of the first through hole.

14 Claims, 6 Drawing Sheets

(56) References Cited

FOREIGN PATENT DOCUMENTS

| CN | 203026605 | U | | 6/2013 | | |
|---|---|---|---|---|---|---|
| CN | 103094620 | B | | 2/2015 | | |
| CN | 205790234 | U | | 12/2016 | | |
| CN | 107219817 | A | * | 9/2017 | ............. | G05B 19/05 |
| CN | 107248593 | A | | 10/2017 | | |
| CN | 107978798 | A | * | 5/2018 | ........ | H01M 10/0404 |
| CN | 108075201 | A | | 5/2018 | | |
| CN | 207338554 | U | | 5/2018 | | |
| CN | 208256831 | U | * | 12/2018 | .......... | H01M 10/058 |
| EP | 3 518 322 | A1 | | 7/2019 | | |
| JP | 2002-289485 | A | | 10/2002 | | |
| JP | 2003-346855 | A | | 12/2003 | | |
| JP | 2013-171965 | A | | 9/2013 | | |
| JP | 2018-529182 | A | | 10/2018 | | |
| KR | 10-2012-0029584 | A | | 3/2012 | | |
| KR | 101173185 | B1 | * | 8/2012 | | |
| KR | 10-2015-0014544 | A | | 2/2015 | | |
| KR | 10-2015-0037949 | A | | 4/2015 | | |
| KR | 10-2015-0082957 | A | | 7/2015 | | |
| KR | 10-2016-0106917 | A | | 9/2016 | | |
| KR | 10-2017-0068145 | A | | 6/2017 | | |
| KR | 10-1793162 | B1 | | 11/2017 | | |
| KR | 10-2018-0082759 | A | | 7/2018 | | |
| KR | 10-2018-0093321 | A | | 8/2018 | | |
| KR | 10-1896218 | B1 | | 9/2018 | | |
| KR | 10-1949687 | B1 | | 2/2019 | | |

OTHER PUBLICATIONS

English Machine Translation of CN 107978798 A (Year: 2018).*
English Machine Translation or CN-208256831-U (Year: 2018).*
English Machine Translation of CN-107219817-A (Year: 2017).*
English Machine Translation of KR-101173185-B1 (Year: 2012).*
English Machine Translation for CN-103094620-A (Year: 2013).*
Extended European Search Report for European Application No. 20880585.3, dated Jan. 18, 2022.
International Search Report for PCT/KR2020/014463 mailed on Feb. 8, 2021.

* cited by examiner

SEQUENTIAL PRESSURE FORMATION JIG AND FORMATION METHOD USING SAME

TECHNICAL FIELD

This application claims the benefit of priority based on Korean Patent Application No. 10-2019-0136343, filed on Oct. 30, 2019, and the entire contents of the Korean patent application are incorporated herein by reference.

The present invention relates to a formation jig of a lithium secondary battery and a formation method using the same, and more particularly, to a formation jig capable of sequentially pressing the plane of a lithium secondary battery and a formation method using the same in order to impart directionality to the electrolyte solution of the lithium secondary battery.

BACKGROUND ART

Pouch-type lithium secondary batteries (hereinafter, referred to as battery cells) as a unit cell constituting a battery are flexible, have a relatively free shape, are light in weight, and are excellent in safety, so the demand for the batteries as a power source for portable electronic devices such as mobile phones, camcorders, and notebook computers is on the increase.

In the battery cell, a plurality of positive electrodes (aluminum foil) and negative electrodes (copper foil) are stacked with a separator interposed therebetween, and a positive electrode tab is welded to the positive electrode and a negative electrode tab is welded to the negative electrode, which is then is sealed with an aluminum pouch.

The manufacturing process of such a battery cell is largely divided into three processes: electrode, assembly, and formation. In the electrode process, a positive electrode and a negative electrode are made by mixing materials in an appropriate ratio. Then the positive electrode is coated with aluminum, and the negative electrode is coated with copper foil, which are then compressed to a certain thickness through a roll press to thereby become flat, and are then cut according to the electrode size, which is a slitting process.

In addition, the assembly process includes a stack & folding process in which the positive electrode material, the separator, and the negative electrode material are alternately stacked through notching to remove unnecessary parts from the electrode, and then folded several times according to the battery capacity, or a winding process of overlapping and winding electrodes and separators, and a process of packaging with an aluminum film packaging material, and then injecting electrolyte and sealing in a vacuum state.

Finally, the formation process is a process of activating the battery cell by repeating charging/discharging of the assembled battery cell, and performing a degassing process in which gas generated in the battery cell is discharged upon activation.

During such a formation process, a large amount of gas is generated due to a chemical reaction or a side reaction between the electrode and the electrolyte solution, and a formation jig is used to pressurize the battery cell to remove the gas.

Figure 1:
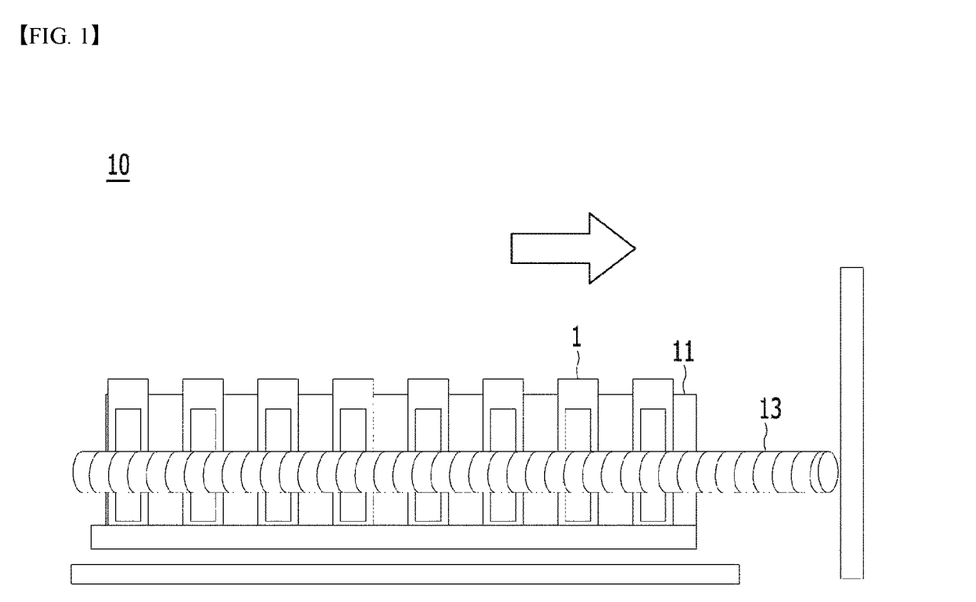
FIG. 1 is a view showing a conventional formation jig.

FIG. 1 shows a conventional formation jig. Referring to FIG. 1, a formation jig 10 includes a plurality of pressing plates 11, and the pressing plates are connected by a pressing screw 13. Then, after inserting the battery cell 1 between the pressing plates, the pressing plate is moved in one direction (arrow) by operating the screw to thereby press the battery cell. However, since the pressing plate is in the form of a flat plate, pressure is transmitted on the plane of the battery cell without division of regions during pressurization.

On the other hand, in order to effectively remove the gas inside the battery cell, it is effective to give directionality to the electrolyte solution pushed out during pressurization. This is because when the electrolyte solution is pushed out during pressurization, the internal gas tends to be pushed out like the electrolyte solution. Therefore, there is a need to develop a technology for a pressing plate capable of imparting directionality to an electrolyte solution during pressurization.

DISCLOSURE

Technical Problem

An object of the present invention is to provide a formation jig for imparting directionality to an electrolyte solution inside a battery cell by sequentially pressing a battery cell using a formation jig including a plate-shaped pressing plate.

Another object of the present invention is to provide a formation method of pressing a battery cell using a formation jig that imparts directionality to an electrolyte solution.

Technical Solution

A formation jig of the present invention for solving the above problems is a formation jig including a pressing plate configured to press a battery cell, the pressing plate having a first through hole; a pressing support plate configured to support the battery cell when the pressing plate presses an upper or lower portion of the battery cell, the pressing support plate having a second through hole and a third through hole; a first screw configured to pass through first through hole of the pressing plate and the second through hole of the pressing support plate and to move the pressing plate in a gap-adjusting direction by rotation thereof; and a second screw configured to pass through the third through hole of the pressing support plate and to move the pressing support plate in the gap-adjusting direction by rotation thereof, wherein a diameter of the second through hole is larger than a diameter of the first through hole.

In the formation jig according to an embodiment of the present invention, the pressure plate and the pressure support plate are installed in plurality in parallel.

In an embodiment of the present invention, the pressing plate is divided into an upper pressing region and a lower pressing region, and the first through hole is provided in plurality such that each of the upper pressing region and the lower pressing region has at least one pair of first through holes.

In an embodiment of the present invention, a diameter of the second through hole is 1.2 to 2 times a diameter of the first through hole.

In an embodiment of the present invention, a cross-sectional area of the pressing support plate is larger than a cross-sectional area of the pressing plate. Herein, the second through hole is provided in plurality, and the third through is provided in plurality such that each of the third through holes may be located outside a region defined by the second through holes.

In an embodiment of the present invention, each of the pressing plate and the pressing support plate has a pressure pad attached to at least one surface thereof.

In an embodiment of the present invention, the pressing plate and the pressing support plate move separately.

A formation method according to the present invention is a method of sequentially pressing top and bottom surfaces of a battery cell using the formation jig and includes: a first step of accommodating the battery cell between the pressing plate and the pressing support plate, and moving the pressing plate and the pressing support plate in a first direction, which is a gap-adjusting direction, to thereby make the pressing plate, the battery cell, and the pressing support plate to closely contact each other; a second step of pressing the battery cell in a second direction, which is a direction opposite to the gap-adjusting direction, by an upper or lower pressing region of the pressing plate, after the first step; and a third step of pressing a portion of the battery cell that was not pressurized in the second step.

In an embodiment of the present invention, the pressing plate is divided into an upper pressing region and a lower pressing region, the first through hole is provided in plurality such that the lower pressing region has a pair of first through holes, the first screw is provided in plurality, and, in the second step, the lower pressing region of the pressing plate presses the a lower surface of the battery cell by operating the first screes penetrating the first through holes of the lower pressing region.

In an embodiment of the present invention, in the second step, when the lower pressing region of the pressing plate presses a lower portion of the battery cell, the battery cell is supported by the pressing support plate.

In an embodiment of the present invention, the second step includes: a 2-A step of pressing the battery cell in the second direction by one of a lower left portion or a lower right portion of the pressing plate; and a 2-B step of pressing the battery cell in the second direction by a another of the lower right-portion or the lower left right portion of the pressing plate, and wherein the 2-A step and the 2-B step are performed sequentially.

In an embodiment of the present invention, the battery cell is charged/discharged, and is pressurized while charging/discharging or after charging/discharging.

Advantageous Effects

In the formation jig and formation method of the present invention, the battery cells are sequentially pressurized to impart directionality to the electrolyte solution, so that gas inside the battery cells can be easily discharged.

DETAILED DESCRIPTION OF THE PREFERRED EMBODIMENTS

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Figure 2:
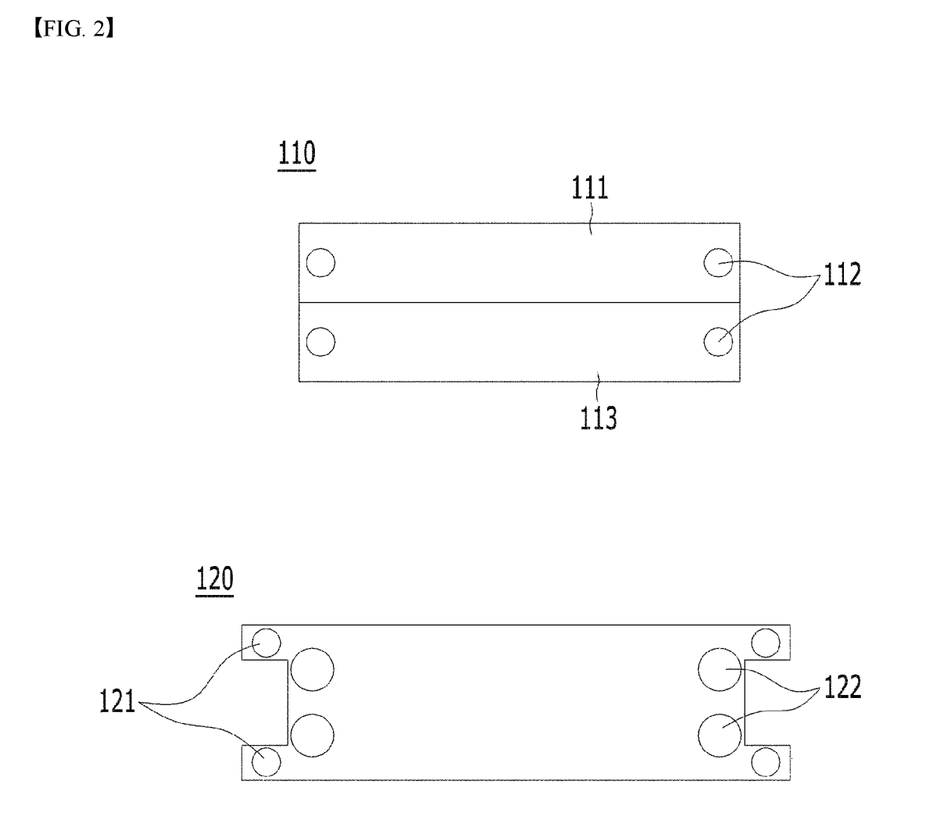
FIG. 2 is a view showing a pressing plate and a pressing support plate according to an embodiment of the present invention.

FIG. 2 is a view showing a pressing plate and a pressing support plate according to an embodiment of the present invention.

Referring to FIG. 2, a pressing plate 110 according to an embodiment of the present invention includes first through holes 112 through which a first screw (not shown) passes. The pressing plate 110 has an area and shape corresponding to a battery cell to be pressed, and is connected to a first screw to be described later, so that it moves in a horizontal direction through rotation of the first screw, and is in close contact with the battery cell, to thereby press the battery cell.

The first through holes are located on the outer peripheral surface with respect to a portion where the battery cell contacts. This is because the first screws passing through the first through holes should not be in contact with the battery cells.

In one specific example, the pressing plate 110 may be divided into an upper pressing region 111 that presses the upper side plane of the battery cell and a lower pressing region 113 that presses the lower side plane of the battery cell. Each of the upper pressing region 111 and the lower pressing region 113 includes one or more pairs of first through holes 112. When the number of the first through holes is at least one pair or more than one, the pressing plate may uniformly press the battery cell.

First screws, which will be described later, are inserted into the four through holes 112, respectively, and the first screws are configured to be independently rotatable. Accordingly, only the lower pressing region is moved by rotation of the first screws inserted into the lower pressing region 113, and at this time, the upper pressing region 111 does not move.

The pressing support plate according to an embodiment of the present invention is a plate added to function to support the battery cell when the pressing plate presses one of the lower or upper portion of the battery cell. In the formation jig of the present invention, in order to impart directionality to the electrolyte during pressurization, the pressing plate sequentially pressurizes the battery cell from the bottom to the top of the battery cell, from the top to the bottom of the battery cell, or from the left to the right of the battery cell. In this case, in order to efficiently perform sequential pressurization, a pressing support plate that supports the battery cell separately from the pressing plate is required.

Referring to FIG. 2, the pressing support plate 120 according to an embodiment of the present invention includes a plurality of second through holes 122 through which first screws pass and a plurality of third through holes 121 through which second screws pass. The second through holes 122 and the third through holes 121 are formed on the outer peripheral surface of a predetermined portion contacting the battery cell, thereby preventing the screws from contacting the battery cell.

In one specific example, in one pressing support plate, two pairs of the second through holes and the third through holes may be formed, respectively. Among them, a pair of third through holes may be formed in an upper portion, and each is formed at a vertex portion where two corners of the upper left portion meet and a vertex portion where two corners of the upper right portion meet. Similarly, one third through hole is also formed at a vertex portion where two corners of the lower left side and two corners of the lower right side meet each other, in the lower portion.

In one specific example, the cross-sectional area of the pressing support plate is larger than the cross-sectional area of the pressing plate. Here, the cross-sectional area refers to an area of a portion that faces the battery cell during pressurization. When the pressing plate sequentially presses the battery cells from the upper or lower end of the battery cell to the lower or upper region, in order for the pressing support plate to stably support the battery cell, it is effective that the area of the pressing support plate is larger than that of the pressing plate.

It is preferable that the pressing plate and the pressing support plate each have a pressure pad attached to at least one surface. The pressure pad functions to prevent damage to the electrode assembly by absorbing the impact caused by the pressure by being in close contact with the battery cell when the pressing plate pressurizes the battery cell. Therefore, the pressure pad is preferably made of a material having elasticity in order to reduce impact, and specifically, it is preferable to include rubber or polyurethane-based polymer resin.

The pressing plate 110 and the pressing support plate 120 are arranged side by side. Herein, in order for the first screws to pass through the pressing plate 110 and the pressing support plate 120 together, the first through holes 112 and the second through holes 122 are positioned in a row and overlapped.

The present invention is characterized in that, in the diameters of the first through hole and the second through hole through which the first screw passes, the diameter of the second through hole is larger than the diameter of the first through hole. This is to ensure that when the first screw is rotated, only the pressing plate 110 moves, and the pressing support plate is not affected by the rotation of the first screw.

Figure 3:
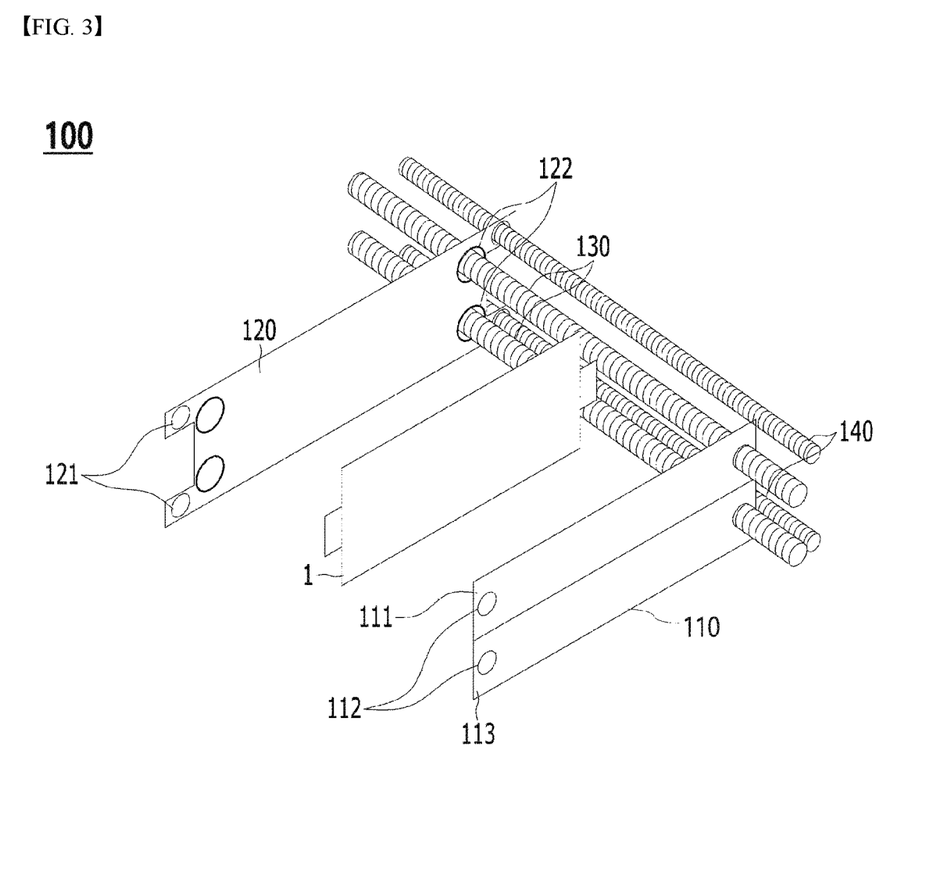
FIGS. 3 to 5 are views showing a formation jig according to an embodiment of the present invention.

FIG. 3 shows a formation jig according to an embodiment of the present invention. Referring to FIG. 3, the formation jig 100 of the present invention includes: a pressing plate 110; a pressing support plate 120; a first screw 130 configured to pass through the pressing plate and the pressing support plate and move the pressing plate in a gap-adjusting direction by rotation; and a second screw 140 configured to pass through and the pressing support plate and move the pressing support plate in a gap-adjusting direction by rotation.

In one specific example, the formation jig may include a frame (not shown) that defines the appearance of the jig formation. The frame accommodates a plurality of pressing plates, pressing support plates, and battery cells. In addition, the frame supports the pressing plate, the pressing support plate, and the battery cell. The frame may have an inner wall 150 at an end in a direction of adjusting a gap for support. In addition, the pressing plate and the pressing support plate are provided in plural in parallel to the inside of the frame.

Referring to FIG. 3, the first screw 130 penetrates the first through hole 112 formed in the pressing plate 110 and the second through hole 122 formed in the pressing support plate 120 together. And, since the diameter of the second through hole 122 formed in the pressing support plate 120 is larger than the diameter of the first through hole 112, the pressing support plate 120 has a structure that is not affected by the rotation of the first screw 130. That is, when the pressing plate 110 moves in the gap-adjusting direction or in the pressing direction by the operation of the first screw 130, the pressure support plate 120 has a structure in which its operation can be individually controlled with the pressing plate 110 without being affected.

The diameter of the second through hole is not limited as long as it is not affected by the operation of the first screw, and specifically, it may be 1.2 times or twice the first through hole diameter.

Referring to FIG. 3, four second screws 140 may pass through four third through holes 121 formed in the pressing support plate 120. However, the state in which the screw passes through the through holes in the upper left portion and the lower left portion is omitted in the drawings for convenience. The pressing support plate is configured to move in the gap-adjusting direction by rotation of the second screws 140.

The first screw is inserted into the first through hole and the second through hole along the arrangement direction of the plurality of pressing plates and the plurality of pressing support plates, and the second screw is inserted into the third through hole along the arrangement direction of the plurality of pressing plates and the plurality of pressing support plates. The first screw and the second screw have a cylindrical body extending along the arrangement direction of the pressing plate and the pressing support plate, and are designed to horizontally move the pressing plates and the pressing support plates by rotation.

The first screw and the second screw can be operated individually. Accordingly, the pressing plate moving in the horizontal direction by the operation of the first screw and the pressing support plate moving in the horizontal direction by the operation of the second screw can be moved separately.

In addition, the plurality of first screws passing through the pressing plate are distributed in the upper pressing region and the lower pressing region to thereby penetrate the pressing plate. The first screws penetrating the upper pressing region portion and the first screws penetrating the lower pressing region are also individually operated, so that the lower pressing region and the upper pressing region can be individually pressed.

Furthermore, if at least one or more pairs of first screws are respectively designed to pass through the upper and lower pressing regions, the pressing plate can be divided into a lower left pressing region, a lower right pressing region, an upper left pressing region, and an upper right pressing region, and by sequentially operating the screws passing through these regions, the lower left, lower right, upper left and upper right of the battery cell may be sequentially pressed.

Hereinafter, a method of sequentially pressing the battery cells using the formation jig of the present invention will be described.

Figure 4:
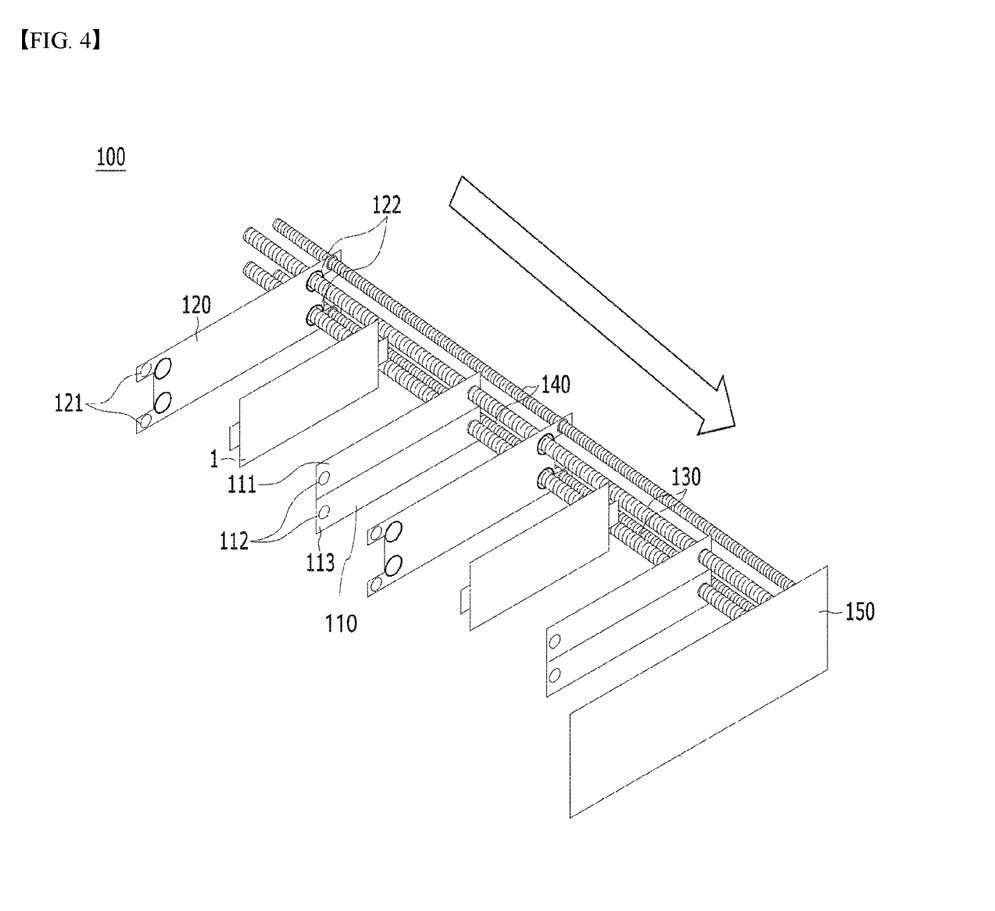
Figure 5:
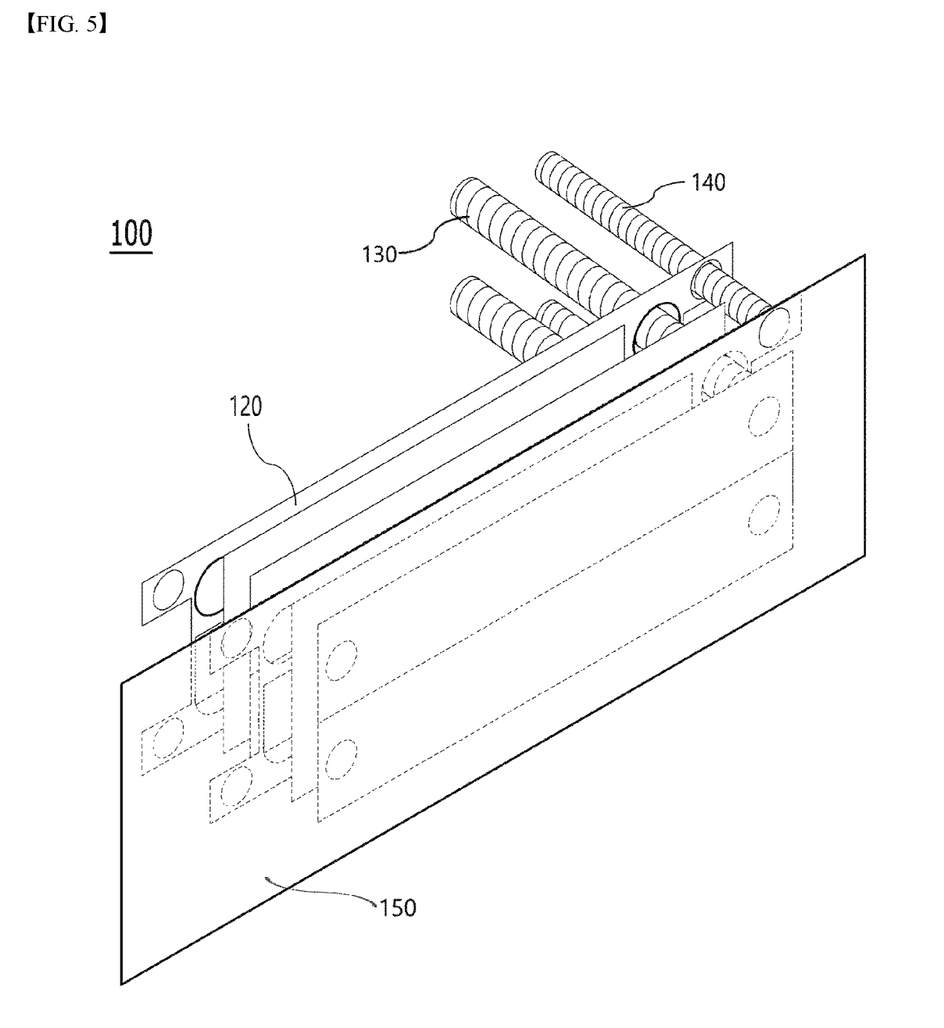
Figure 6:
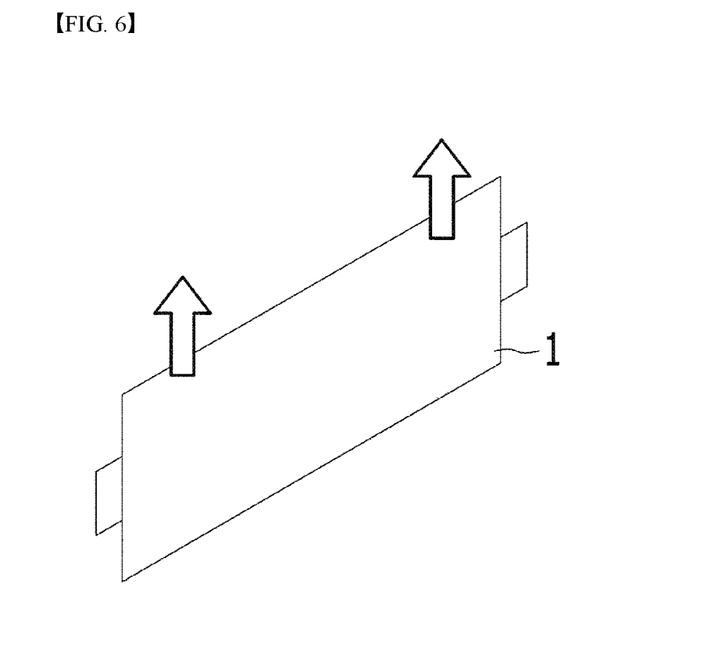
FIG. 6 is a view showing a formation method according to an embodiment of the present invention.

Referring to FIGS. 4 to 6, first, a plurality of battery cells 1 are mounted between one pressing plate 110 and one pressing support plate 120, respectively. Thereafter, a first step of making the battery cell 1 to be in close contact with the pressing plate 110 and the pressing support plate 120 is performed as illustrated in FIG. 5 by moving the pressing plate 110 and the pressing support plate 120 in the first direction, which is the gap-adjusting direction, respectively, by the rotation of the first screw 130 and the second screw 140.

In an embodiment of the present invention, after performing the first step, the second step of pressing the lower portion of the battery cell corresponding to the lower pressing region of the pressing plate may be performed by rotating only the first screws penetrating the lower pressing region portion while still keeping the first screws penetrating the upper pressing region portion of the pressing plate 110. In this case, the direction in which the lower pressing region of the pressing plate presses the battery cells is a second direction opposite to the gap-adjusting direction. That is, in a state in which the pressing plate, the battery cell, and the pressing support plate are in close contact, only the lower pressing region of the pressing plate moves in the second direction to press the battery cell.

On the other hand, since the battery cell has a plate-shaped structure, when the lower pressing region of the pressing plate applies force to the battery cell in the second direction, the portion of the battery cell that is not pressurized is inclined toward the first direction opposite to the second direction, and thus, the pressing force by the pressing plate may not be effectively transmitted to the lower portion of the battery cell. As such, according to the formation jig of the present invention, by including a pressing support plate mated with the pressing plate, when pressing the lower portion of the battery cell, the upper portion of the battery cell is supported by the pressing support plate so that the battery cell is not inclined, and the lower portion of the battery cell can be effectively pressed.

When only the lower portion of the battery cell is pressed through the second step, the excess space between the electrode assembly and the battery case at the lower portion decreases. As a result, the electrode assembly and the electrolyte solution in the excess space are pushed out to a region of the upper portion where the excess space is relatively wide. At this time, as the electrolyte solution is pushed out, the electrode assembly and the internal gas in the excess space are pushed out together with the electrolyte solution, so that the gas inside the battery cell can be effectively removed.

In the above embodiment, the pressing plate sequentially presses from the upper portion of the battery cell from the lower portion of the battery cell. However, unlike this, the pressing plate may sequentially press from the upper portion of the battery cell toward the lower portion of the battery cell. In addition, it is possible for the pressing plate to sequentially press from the left portion of the battery cell toward the right portion of the battery cell or from the right portion to the left portion.

However, in general, when the battery cell is mounted on a formation apparatus, the battery cell is often stored in the formation apparatus with the gas pocket unit of the battery cell facing upward. As such, it is preferable to pressurize sequentially from the lower portion of the battery cell to the upper portion of the battery cell.

In another embodiment of the present invention, the second step may include: a 2-A step of pressing the battery cell in the second direction by a lower left or lower right portion of the pressing plate; and a 2-B step of pressing the battery cell in the second direction by a lower right or lower left portion of the pressing plate. Herein, the 2-A step and the 2-B step may be performed sequentially.

Figure 7:
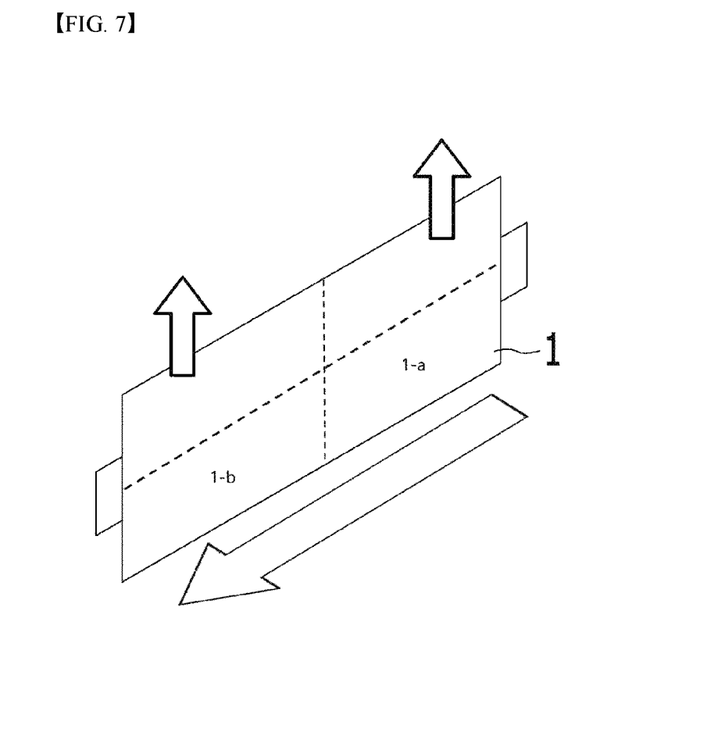
FIG. 7 is a view showing a formation method according to another embodiment of the present invention.

As described above, the pressing plate of the present invention can be divided into a lower left pressing region, a lower right pressing region, an upper left pressing region, and an upper right pressing region, and by sequentially operating the screws passing through these regions, the lower left, lower right, upper left and upper right of the battery cell may be sequentially pressed. Referring to FIG. 7, by sequentially pressing the lower right region (1-$a$) and the lower left region (1-$b$) of the pressing plate, the electrolyte solution can be moved in a direction from right to left (arrow) with directionality. In addition, by sequentially pressing the pressing plate from the lower end to the upper end, the electrolyte solution may move in a direction from the lower end to the upper end with directionality.

In the second step, the state of pressing only the lower portion of the battery cell may be maintained for a certain time. The time may be several seconds to several tens of minutes, and this may be selected by a person skilled in the art in consideration of the pressure during pressurization, the size of the battery cell, and the type of electrodes and electrolyte solutions constituting the battery cell.

After the second step, a third step of pressing the upper portion not pressed in the first step is performed. In the third step, the first screw penetrating the first through holes formed in the upper pressing region of the pressing plate is operated in the same manner as in the second step, so that the upper pressing region of the pressing plate moves finely in the second direction, to thereby pressurize the upper portion of the battery cell.

Although the above has been described with reference to a preferred embodiment of the present invention, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

The invention claimed is:

1. A formation jig, comprising:
   a pressing plate configured to press a battery cell, the pressing plate having a first through hole;
   a pressing support plate configured to support the battery cell when the pressing plate presses an upper or lower portion of the battery cell, the pressing support plate having a second through hole and a third through hole;
   a first screw configured to pass through the first through hole of the pressing plate and the second through hole of the pressing support plate and to move the pressing plate in a gap-adjusting direction along the first screw by rotation thereof, and
   a second screw configured to pass through the third through hole of the pressing support plate and to move the pressing support plate in the gap-adjusting direction along the second screw by rotation thereof,
   wherein a diameter of the second through hole is larger than a diameter of the first through hole, and
   wherein the pressing plate and the pressing support plate are installed in plurality and alternatingly arranged in parallel.

2. The formation jig of claim 1, wherein the pressing plate is divided into an upper pressing region and a lower pressing region, and
   wherein the first through hole is provided in plurality such that each of the upper pressing region and the lower pressing region has at least one pair of first through holes.

3. The formation jig of claim 1, wherein a diameter of the second through hole is 1.2 to 2 times a diameter of the first through hole.

4. The formation jig of claim 1, wherein a cross-sectional area of the pressing support plate is larger than a cross-sectional area of the pressing plate.

5. The formation jig of claim 4, wherein, in the pressing support plate, the second through hole is provided in plurality, and
   wherein the third through hole is provided in plurality such that each of the third through holes is located outside a region defined by the second through holes.

6. The formation jig of claim 1, wherein each of the pressing plate and the pressing support plate has a pressure pad attached to at least one surface thereof.

7. The formation jig of claim 1, wherein the pressing plate and the pressing support plate move separately.

8. A formation method of sequentially pressing top and bottom surfaces of a battery cell using the formation jig of claim 1, the formation method comprising:
- a first step of accommodating the battery cell between the pressing plate and the pressing support plate, and moving the pressing plate and the pressing support plate in a first direction, which is the gap-adjusting direction, to thereby make the pressing plate, the battery cell, and the pressing support plate to contact each other;
- a second step of pressing the battery cell in a second direction, which is a direction opposite to the gap-adjusting direction, by an upper or lower pressing region of the pressing plate, after the first step; and
- a third step of pressing a portion of the battery cell that was not pressurized in the second step.

9. The formation method of claim 8, wherein the pressing plate is divided into an upper pressing region and a lower pressing region,
- wherein the first through hole is provided in plurality such that the lower pressing region has a pair of first through holes,
- wherein the first screw is provided in plurality, and
- wherein, in the second step, the lower pressing region of the pressing plate presses a lower surface of the battery cell by operating the first screws penetrating the pair of first through holes of the lower pressing region.

10. The formation method of claim 9, wherein, in the second step, when the lower pressing region of the pressing plate presses a lower portion of the battery cell, the battery cell is supported by the pressing support plate.

11. The formation method of claim 8, wherein the second step comprises:
- a 2-A step of pressing the battery cell in the second direction by one of a lower left portion or a lower right portion of the pressing plate; and
- a 2-B step of pressing the battery cell in the second direction by another of the lower left portion or the lower right portion of the pressing plate, and wherein the 2-A step and the 2-B step are performed sequentially.

12. The method of claim 8, wherein the battery cell is charged/discharged, and is pressurized while charging/discharging or after charging/discharging.

13. The formation jig of claim 1, wherein, in the pressing support plate, the second through hole is provided as a pair of upper second through holes and a pair of lower second through holes, and
- wherein the third through hole is provided as a pair of upper third through holes and a pair of lower third through holes such that each of the third through holes is located outside a region defined by the second through holes.

14. The formation jig of claim 1, wherein the first through hole and the second through hole are positioned in a row and overlapped in the gap-adjusting direction.

* * * * *